July 14, 1970   G. ERB ET AL   3,520,083
SWINGABLE SLIDING CAR DOOR ASSEMBLY
Filed April 17, 1968   3 Sheets-Sheet 2
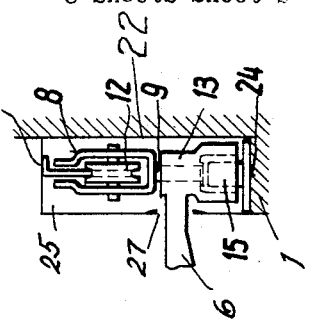
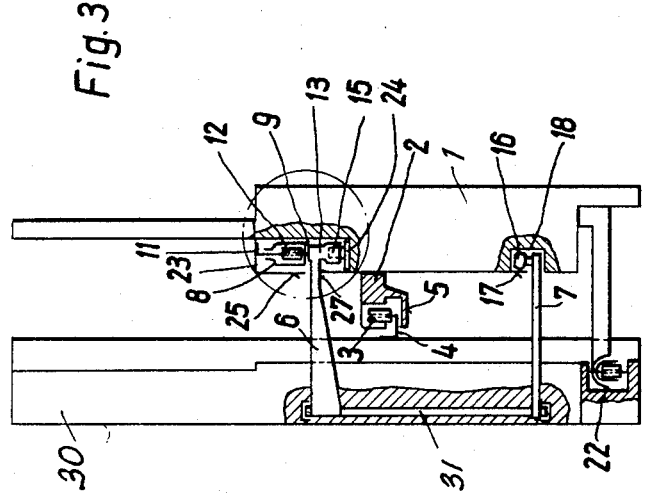
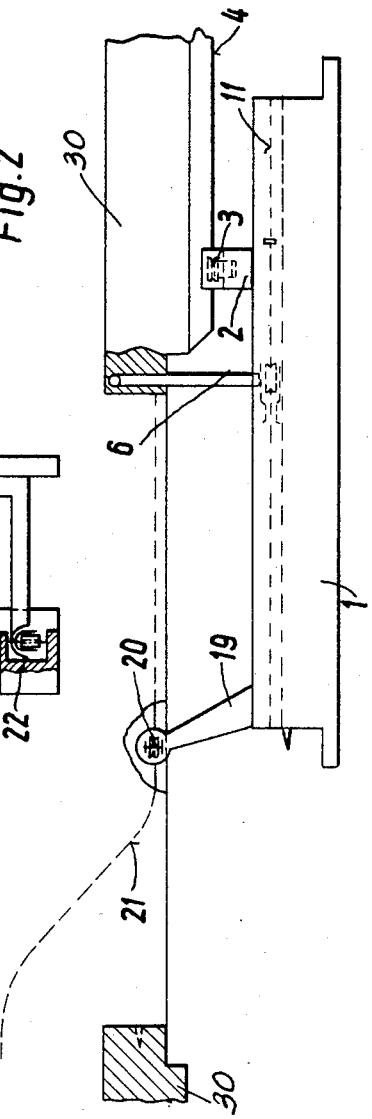
Inventors
GERHARD ERB
INGO BRITZKE
BY Hane and Baxley
ATTORNEYS

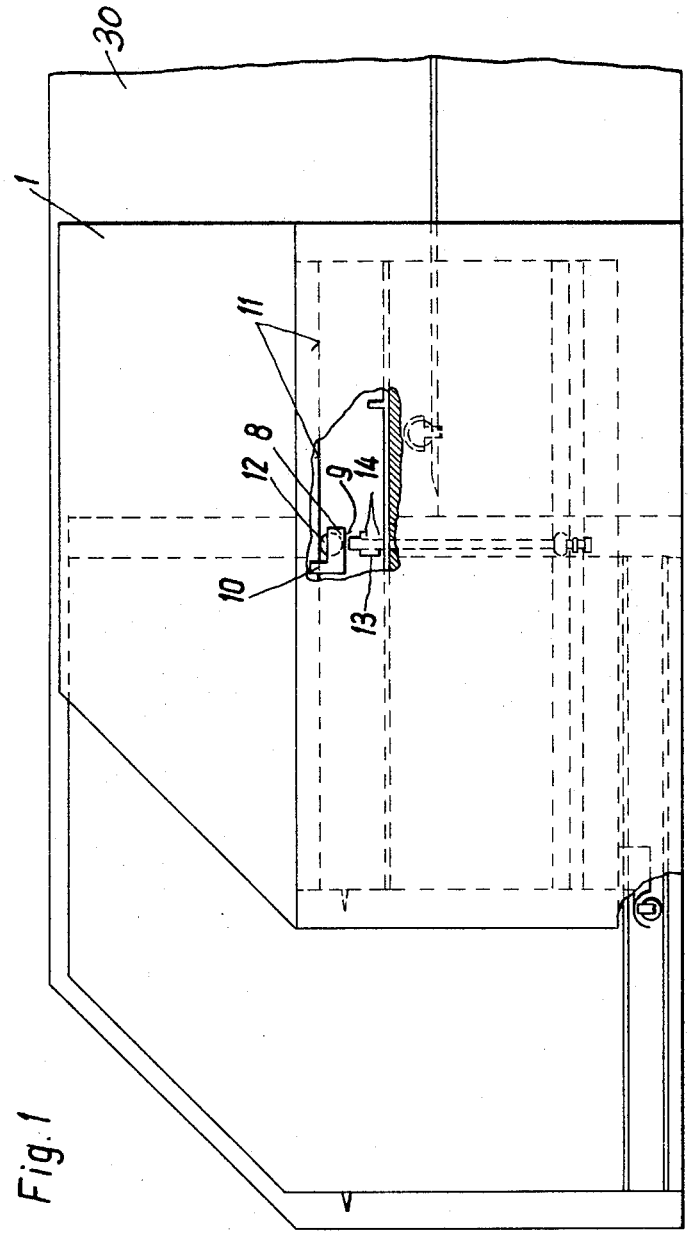

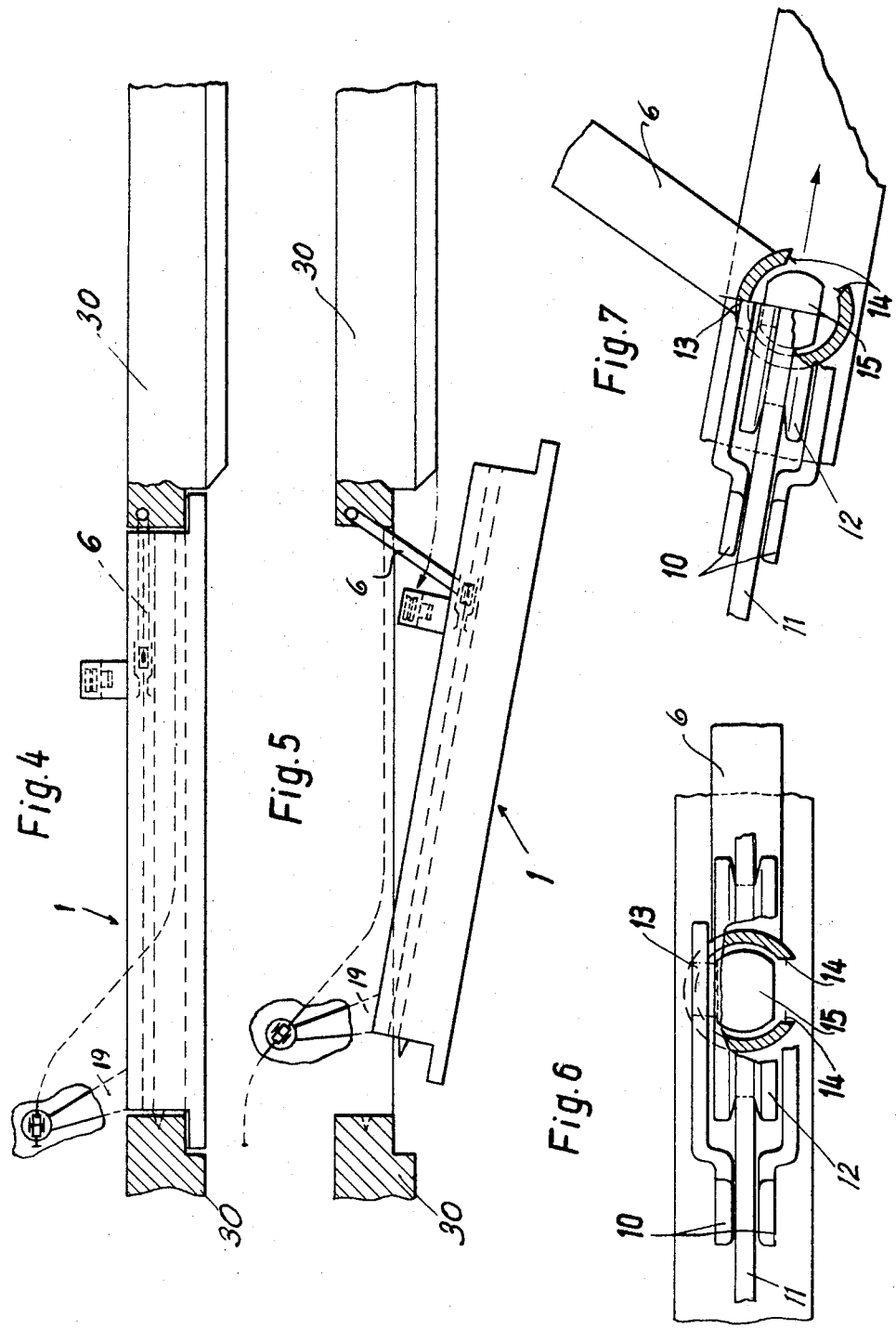

United States Patent Office 3,520,083
Patented July 14, 1970

1

3,520,083
SWINGABLE SLIDING CAR DOOR ASSEMBLY
Gerhard Erb, Kassel, and Ingo Britzke, Kassel-Bettenhausen, Germany, assignors to Wegmann & Co., Kassel-Bettenhausen, Germany, a company of Germany
Filed Apr. 17, 1968, Ser. No. 722,039
Claims priority, application Germany, Apr. 21, 1967, W 43,820
Int. Cl. E05d 15/10
U.S. Cl. 49—212        5 Claims

ABSTRACT OF THE DISCLOSURE

A door for a car particularly for a passenger car which can be opened and closed by a combination of swinging and sliding movements. Linkage means steady the door in all positions thereof. The linkage means also guide and support the door while the same is being moved into and out of its closed position and prevent effectively a tilting of the door out of its correct vertical plane. The door can be gently closed, or can be slammed in the same manner as a hinged door. The entire linkage and guidance mechanism of the door is concealed except for a few barely noticeable slots on the outside of the car body and at the door frame so that the ornamental appearance of a car equipped with the door according to the invention is not marred.

---

The invention relates to swingable sliding doors for cars especially passenger cars and more particularly to a door which can be moved out of its position closing the door opening in the car body by means of two support bars which are linked on one end to the door frame in vertically spaced and mutually parallel relationship and the other ends of which are slideable in guide tracks provided in the inside wall of the door.

There are known, for instance, from British Pat. 389,061 swingable sliding car door assemblies in which a wheeled carrier is displaceable on a guide track provided below the lower horizontal beam of the door frame. A guide bar is linked on one end to this carrier and guided at the other end between two pairs of rolls which are fixedly mounted on the inner wall of the swingable sliding door.

In such arrangement, the door, after it has been swung outwardly by means of the aforementioned pivotal support bars, slides along said guide bar whereby the end of the guide bar linked to the carrier is simultaneously moved along the guide track below the door frame.

A door assembly of this kind has the disadvantage that due to unfavorable directions of force and an unfavorable distribution of the load, an easy slamming of the door—as is possible with hinged doors and as is also desirable for sliding doors—cannot be effected. Moreover, the door is not safely guided and supported at one end of its side edges, especially when it is in the swung-out position. As a result, the door cannot safely sustain additional loads as may be caused for instance, by a person leaning upon the upper edge of the door as occurs frequently.

It is an object of the invention to provide a novel and improved swingable sliding car door assembly which permits a gentle closing of the door or a slamming thereof, as desired.

A more specific object of the invention is to provide a novel and improved car door assembly of the general kind above referred to in which the door is safely and strongly supported in all positions thereof without marring to an appreciable extent the appearance of the car body by the guide and support mechanism for the door.

2

The afore-pointed out objects, features and advantages and other objects, features and advantages which will be pointed out hereinafter, are obtained by providing a pair of support bars pivotal at one end about a vertical shaft secured to one vertical side of the door frame of the car body. This pivot shaft holds the two bars in vertically spaced and mutually parallel relationship. The other end of each bar is slideably retained in a horizontal elongate guide track fitted in the inner side wall of the door. A support roll is rigidly secured on one of the side edges of the door intermediate the length of said edge and engaged by a rail on an outside wall of the car body when the door is swung outwardly. One of the support bars, preferably the upper one, mounts at its end engaged with the door a guide roll which is rotatably about a horizontal axis and also pivotal about its vertical axis. This roll supports a rail secured to the inside wall of the door and slideable along the support roll. The other vertical side edge of the door has secured thereto a rigid guide bar which mounts on its free end a support roll which rolls on and is guided by a guide track disposed in the car body below the lower horizontal frame beam of the door opening.

In a door assembly of this kind the only components of the mechanism which are visible is the guide track provided at about the middle of an outside wall of the car body and the guide track below the door opening. The upper part of the car body is free of any guide tracks so that the overall appearance of the car body is not appreciably marred.

The other one of the two pivotal support bars, preferably the lower one, mounts on its free end a support roll rotatable about a vertical axis. The roll is movable along an angle rail secured in a guide track inserted into the inside wall of the door. The rail guiding the roll covers the guide track partly by overhanging the outwardly facing side thereof.

The structure of the invention also includes a substantially cylindrical housing disposed below the afore-referred to guide roll mounted on the free end of the upper one of the two pivotal support bars. This housing has in its side wall a slot through which the housing is entered by an elongate guide member secured to the inside wall of the door when the door approaches its closed position. The inner diameter of the housing, the width of the slot and the dimensions of the length and the width of the guide member are so correlated that the guide member is locked in the housing during the initial stage of swinging the door into or out of the door opening. Only when the door and more specifically, the pivotal support bars therefor reach or are in the swung-out position, the guide member is so positioned that it can be withdrawn from the housing through the slot therein whereupon the door can be slid by means of its rail along the roll supported by the respective upper pivotal support bar. Simultaneously the support roll on the inner door wall engages the aforedescribed rail on the outside wall of the car body.

Hence, the door while being slid is supported by the guide rolls and the support rolls and the rails coacting therewith.

Tilting of the door out of its vertical planes is prevented by the rolls on the pivotal support bars.

The invention also provides that a frame structure for the guide roll supported by the upper bar is mounted on this bar rotatable about a vertical axis. The frame structure carries a locking member which straddles the guide rail secured to the inside wall of the door. This arrangement further secures the door against tilting when and while the same is slid for opening or closing.

The end of the upper support bar mounting the guide roll rotatably about a horizontal axis, the support frame therefor rotatable about a vertical axis, the locking member and the slotted cylindrical housing disposed below the guide roll advantageously extend into a cut-out in the inner wall of the door. The base of the cut-out, as seen in vertical direction supports the aforementioned guide member which enters the slotted housing when the door is slid toward its closed position. The cut-out is covered by a casing or box the outwardly facing walls of which are preferably flush with the respective inner walls of the door so that the appearance of said walls is not marred by visible recesses therein.

To prevent the support roll from jumping the rail with which it coacts, a bracket underlying the rail and the support roll may be provided.

In the accompanying drawing a preferred embodiment of the invention is shown by way of illustration and not by way of limitation.

In the drawing:

FIG. 1 is an elevational view, partly in section, of a car door assembly according to the invention, FIG. 2 is a plan view, partly in section, of FIG. 1, FIG. 3 is a side view, partly in section, of FIG. 1, FIG. 3a is a detail view of the encircled portion of FIG. 3 on an enlarged scale, FIG. 4 is a fragmentary diagrammatic plan view, partly in section, of the door in its closed position, FIG. 5 is a plan view similar to FIG. 4 but showing the door in a partly open position, FIG. 6 is a view, partly in section, of parts of the door assembly on an enlarged scale; and FIG. 7 is a view similar to FIG. 6 but showing the same parts in different operational positions.

Referring now to the figures in greater detail the exemplified car door assembly comprises a door 1 which can be moved into and out of a position closing a door opening in a car body 30.

A support arm 2 is secured to the inside wall of the door, approximately at the middle of this wall, and mounts at its free end a support roll 3 rotatable about a horizontal axis. The roll is engageable with a guide rail 4 secured to the car body 30. A bracket 5 underlies rail 4 to prevent a jumping of roll 3 off the rail.

Outward swinging of the door is effected by means of support bars 6 and 7 which are linked to the car body by means of a common pivot shaft 31 holding the bars in vertically spaced apart and mutually parallel relationship. The upper pivotal bar 6 mounts at its free end a frame structure 8 by means of a pin 9 rotatable about a vertical axis. The frame structure accommodates a roll 12 which is rotatable within the frame structure about a horizontal axis. A locking member 10 carried by the frame structure steadies a support rail 11 secured to the inside wall of the door. Said locking member comprises upstanding lugs 10 which straddle or laterally encompass rail 11 to retain roll 12 on the rail. As a result, the door cannot move transverse of the rail. The force to which the roll would be subjected by such transverse movement cannot be readily sustained by the roll.

Support arm 6 further mounts below frame structure 8 and roll 12 a preferably cylindrical housing 13 having in its side wall an elongate slot 14. The housing 13 coacts with an elongate guide member 15 which is secured to the inside wall of the door and disposed so that in the swung-out position of bar 6 and thus also of the door, slot 14 and guide member 15 are in alignment. The width of guide member 15 corresponds to the width of slot 14 and the inner diameter of housing 13 corresponds to the length of the guide member. In other words, the width of the slot is less than the length of the guide member so that the guide member is locked within housing 13 when the arm 6 is swung out of the position in which the slot and the guide member are in alignment. FIG. 6 shows guide member 15 locked within housing 13 and FIG. 7 shows the bar 6 and the guide member turned into a position in which the guide member is just about ready to leave the housing.

The locking action obtained by the coaction of housing 13 and guide member 15 secures the door against a sliding movement while being swung into the door opening. In other words, once the door is positioned for swinging into the door opening it is retained in such position.

The lower pivotal support bar 7 mounts at its free end a roll 16 rotatable about a vertical axis. The roll is rollable along and abuts against a support rail 17 fitted into a groove 18 cut into the inside wall of the door. A depending branch of rail 17 partly overhangs the groove thereby preventing roll 16 from accidentally leaving the rail. As a result, the door is safely guided while being slid and cannot perform any pendulum motions.

A support arm 19 is fixedly secured at the left hand or front edge of the door. The free end of arm 19 mounts a support roll 20 which is rotatable about a horizontal axis and pivotal about its rotational axis. The roll is guided on a rail 21 mounted in a groove of preferably rectangular cross-section provided in the car body below the lower horizontal beam of the door opening.

During opening of the door, pivotal support bars 6 and 7 perform corresponding angular movements, but sliding of the door is initially not possible as the door is secured by guide member 15 which as previously described, is locked in housing 13 while the door is being swung out of the housing. When bars 6 and 7 have reached the swung-out position, guide member 15 is in alignment with slot 14 of housing 13 and can now be withdrawn from the housing by sliding of the door. In the meantime, support roll 3 has engaged rail 4 on the outside of the car body and supports the door when the same is now slid toward the final door opening position. The support of front end of the door is effected by arm 19 and the guide roll 20 thereon.

The end of pivotal bar support 6 mounting frame structure 8, roll 12 and housing 13 extends into a cut-out 22 formed in the inside wall of the door as can best be seen in FIG. 3a. The base 24 of the cut-out supports the aforementioned rail-shaped guide member 15 secured to the inside of the door. A casing 23 preferably covers the cut-out and the parts extended into the same. An outer wall 25 of the casing is substantially flush with the respective surface portions of the door. The wall has a narrow slot 27 through which bar 6 extends into the cut-outs. As is evident, casing 23 substantially conceals the entire mechanism located in cut-out 22.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A swingable sliding door assembly for a car comprising in combination:

a car body having an opening for a door;

a door swingable and slidable into and out of a position closing said door opening;

a pair of support bars each pivotally secured on one end to the car body in vertically spaced and mutually parallel relationship, said door having in its inner side wall a pair of vertically spaced, horizontal elongate tracks, the other ends of said support bars being lengthwise slideably retained in said tracks, said bars steadying the door in vertical position;

a first support roll secured on one of the side edges of the door intermediate the length of said edge;

a first guide rail secured to the car body on an outside wall portion, said guide rail being engaged by said first support roll upon swinging the door out of its closed position and displacing the same parallel to said outside wall portions, said support bars guiding the door into said parallel position upon swinging the door out of its closing position;

a guide rail housing mounted on the other end of said pivotal support bar, said housing being pivotal about a vertical axis, and a first guide roll journaled in said housing for rotation about a horizontal axis;

a second guide rail secured within one of said tracks in a vertically depending position, said first guide roll disposed beneath and in bearing engagement with said second guide rail;

upstanding lugs integral with said guide rail housing straddling said second guide rail thereby retaining said guide roll on said second guide rail;

a support arm rigidly secured to the other side edge of the door; and a second support roll mounted on said support arm rotatable about a horizontal axis and pivotal about a vertical axis, said car body having in a wall portion below the door opening a curved guide track positively guiding said second support roll for steadying the door at said other edge during swinging and sliding of the door.

2. The car door assembly according to claim 1 and further comprising a generally cylindrical housing secured in upright position on said one pivotal support bar for movement in unison therewith, said housing having in its side wall a lengthwise elongate slot, and an elongate guide member secured to the inside wall of the door, said housing slot and said guide member being positioned so as to be in alignment with each other whereby the guide member enters said housing through said slot when the door is slid into the position for closing the door by swinging the same inwardly and leaves the housing when the door is slid from its swung-out position toward the fully open position.

3. The car door assembly according to claim 2 wherein the length of the guide member fits the inner diameter of the housing and the width of the guide member fits the width of the slot whereby the guide member is locked within the housing when the door is in any position other than the swung-out position.

4. The car door assembly according to claim 2 wherein said one pivotal support bar, said first guide roll, said support frame, said guide member and said locking member are disposed in a cut-out in the inside wall of the door.

5. The car door assembly according to claim 4 wherein a casing covers said cut-out, an outer wall of said casing being flush with the inner wall surface of the door.

References Cited

UNITED STATES PATENTS 3,019,492  2/1962  Schimek _____ 49—212

FOREIGN PATENTS 717,071  10/1931  France.
888,869  2/1962  Great Britain.

KENNETH DOWNEY, Primary Examiner

U.S. Cl. X.R.

49—218